United States Patent
Wolff et al.

(10) Patent No.: US 7,620,265 B1
(45) Date of Patent: Nov. 17, 2009

(54) COLOR INVARIANT IMAGE FUSION OF VISIBLE AND THERMAL INFRARED VIDEO

(75) Inventors: Lawrence B. Wolff, New York, NY (US); Diego A. Socolinsky, Baltimore, MD (US); Christopher K. Eveland, Baltimore, MD (US)

(73) Assignee: Equinox Corporation, New York, NY (US)

( * ) Notice: Subject to any disclaimer, the term of this patent is extended or adjusted under 35 U.S.C. 154(b) by 754 days.

(21) Appl. No.: 11/103,640

(22) Filed: Apr. 12, 2005

Related U.S. Application Data

(60) Provisional application No. 60/560,968, filed on Apr. 12, 2004.

(51) Int. Cl.
G06K 9/40 (2006.01)
G06K 9/36 (2006.01)

(52) U.S. Cl. .................. 382/276; 382/254; 382/284

(58) Field of Classification Search .............. 382/276, 382/284, 254
See application file for complete search history.

(56) References Cited

U.S. PATENT DOCUMENTS

| | | | |
|---|---|---|---|
| 5,325,449 A | | 6/1994 | Burt et al. |
| 5,488,674 A | * | 1/1996 | Burt et al. ............ 382/284 |
| 5,555,324 A | | 9/1996 | Waxman et al. |
| 2002/0015536 A1 | * | 2/2002 | Warren et al. ............ 382/284 |

OTHER PUBLICATIONS

Xue, Z.—"Concealed Weapon Detection Using Color Image Fusion"—IEEE 2003, pp. 622-627.*
Anderson, J.—"Integrated Imaging Sensors"—SPIE 2001, vol. 4369, pp. 14-24.*
A. Toet et al, "Merging Thermal and Visual Images by a Contrast Pyramid," Optical Engineering, vol. 28 ( No. 7), p. 789-792, (Jul. 1989).
A. Waxman et al, "Color Night Vision: Opponent Processing in the Fusion of Visible and IR Imagery," Neural Networks, vol. 10 ( No. 1), p. 1-6, (1997).
P. Burt et al, "Enhanced Image Capture Through Fusion," Proceedings of IEEE 4th Int'l Conference on Computer Vision, p. 173-182, (1993).
J. Schuler et al, "Infrared Color Vision: an Approach to Sensor Fusion," Optics and Photonics News, (Aug. 1998).
Socolinsky et al, "Multispectral Image Visualization Through First-Order Fusion," IEEE Transactions on Image Processing, vol. 11 ( No. 8), p. 923-931, (Aug. 2002).
Toet et al, "New False Color Mapping for Image Fusion," Optical Engineering, vol. 35 ( No. 3), p. 650-658, (Mar. 1996).
Horn et al, "Fused Reflected/Emitted Light Sensors," Proceedings of SPIE Infrared Technology and Applications XXVII, vol. 4369, p. 1-13, (2001).

* cited by examiner

Primary Examiner—Bhavesh M Mehta
Assistant Examiner—Bernard Krasnic
(74) Attorney, Agent, or Firm—Jones, Tullar & Cooper, P.C.

(57) ABSTRACT

A methodology for forming a composite color image fusion from a set of N gray level images takes advantage of the natural decomposition of color spaces into 2-D chromaticity planes and 1-D intensity. This is applied to the color fusion of thermal infrared and reflective domain (e.g., visible) images whereby chromaticity representation of this fusion is invariant to changes in reflective illumination.

12 Claims, 14 Drawing Sheets

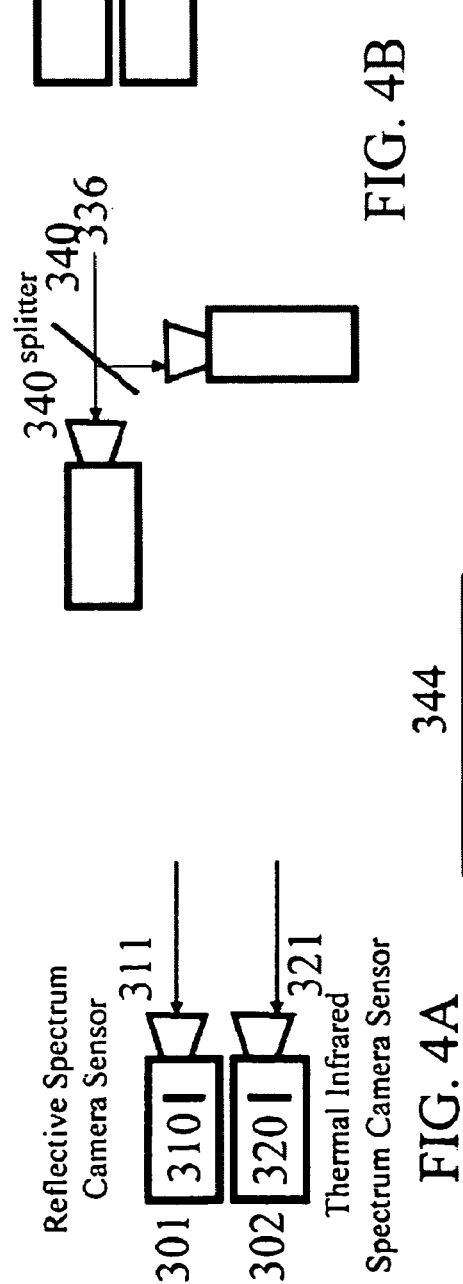
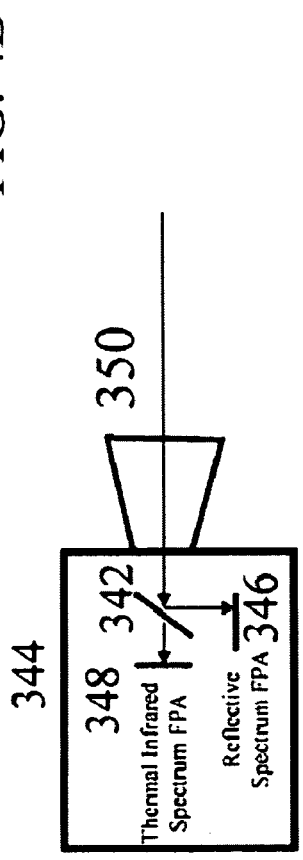
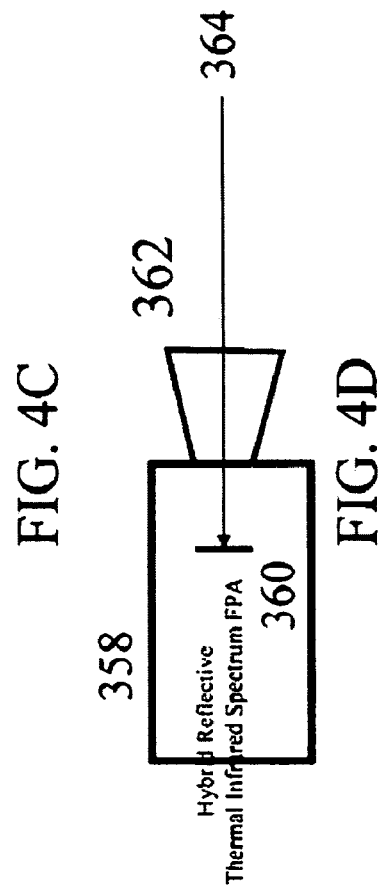
FIG. 4B
FIG. 4C
FIG. 4D
FIG. 4A

COLOR INVARIANT IMAGE FUSION OF VISIBLE AND THERMAL INFRARED VIDEO

CROSS REFERENCE TO RELATED APPLICATIONS

This application claims the benefit, under 35 U.S.C. 119 (e), of U.S. Provisional Application No. 60/560,968, filed Apr. 12, 2004 the disclosure of which is hereby incorporated herein by reference.

BACKGROUND OF THE INVENTION

1. Field of the Invention

The invention described herein relates to the methodology of forming a fused composite color image from source gray level images, with application to visualizing the fusion of video imaging in the infrared spectrum (e.g., thermal infrared) with video imaging in the reflective spectrum (e.g., visible).

2. Description of the Background Art

The advantages of image fusion of the visible and thermal infrared modalities have been studied for quite some time [S. Horn et al., "Fused Reflected/Emitted Light Sensors", Proceedings of SPIE Infrared Technology and Applications XXVII, Vol. 4369, pp. 1-13, 2001]. Visible imaging (which can also include intensified Near-IR imaging) reveals reflective phenomenology complementary to thermal infrared imaging that reveals emissive phenomenology. There are obvious extensions to using reflective SWIR imagery as well. When viewed simultaneously, the visible and thermal infrared modalities can provide significantly enhanced situational awareness for a variety of applications to the dismounted soldier, maritime/naval operations, Unmanned Aerial Vehicles (UAVs) as well as law enforcement. The key issues for practical portable field applications are how to effectively visualize these two complementary modalities at video rates with sufficiently low power consumption and small form factor. One of the simplest visualization schemes is commonly referred to as "A+B" fusion, whereby the signal is combined from each modality in different proportions, or, each modality is represented by a different color and combined together accordingly. This can be conveniently implemented in optical overlay systems. However, such a visualization scheme is usually not suitable for many applications with major drawbacks being the lack of invariance to visible illumination changes and confusion between visible and thermal infrared contrast. A number of computational image fusion methodologies for the visible and thermal infrared wavebands have been developed to address some of these issues [L. van Ruyven A. Toet and J. Valeton. "Merging thermal and visual images by a contrast pyramid". *Optical Engineering*, 28 (7): 789-792, 1989; D. Fay J. Racamato J. Carrick M. Seibert A. Waxman, A. Gove and E. Savoye. "Color night vision: Opponent processing in the fusion of visible and IR imagery." *Neural Networks*, 10(1): 1-6, 199; P. Burt and R. Lolczynski. "Enhanced image capture through fusion." In *Proceedings of IEEE 4th International Conference on Computer Vision*, volume 4, pages 173-182, 1993; J. Schuler M. Satyshur D. Scribner, P. Warren and M. Kruer. "Infrared color vision: An approach to sensor fusion." *Optics and Photonics News*, August 1998; D. A. Socolinsky and L. B. Wolff, "Optimal grayscale visualization of local contrast in multispectral imagery." In *Proceedings: DARPA Image Understanding Workshop*, pages 761-766, Monterey, November 1998; A. Toet, "New false color mapping for image fusion." *Optical Engineering*, 35(3): 650-658, 1996; U.S. Pat. No. 5,325,449, P. Burt et al.; U.S. Pat. No. 5,555,324, A. Waxman et al.]. As the thermal infrared spectrum is beyond human visual perception, the merging of visible and thermal infrared modalities is a non-literal representation placing paramount importance on a visually intuitive fusion methodology. Furthermore, experience has shown that image fusion algorithms appearing intuitive and informative for single still frames are not necessarily appropriate under conditions of continuous operation, particularly if a human observer is immersed in such an environment for significant lengths of time. As with direct human vision, an image fusion scheme needs to have flexibility and adaptability to different scene conditions, where the visible and thermal infrared signatures can have a wide range of combined variability. The user should have the ability to change fusion parameters in order to optimize viewing conditions.

SUMMARY OF THE INVENTION

In its broadest sense this invention teaches how to form a composite color image by fusing together N gray level images which visually segregates information content (e.g., contrast) of the first image from information content of the other N−1 images. Human color perception can be represented by a three-dimensional color space the most appropriate choice of color space dependent upon application. Color spaces including standardly known CIE, RGB and HSV spaces can be naturally decomposed into a stack of 2-D chromaticity (i.e., color) planes along a 1-D luminance (i.e., intensity) axis. This invention teaches the derivation of a fused color composite image, respective to a particular color space, by mapping the N gray values of corresponding pixels so that the chromaticity plane coordinates in this color space are only dependent upon the latter N−1 gray values, and independent of the first gray value. The intensity value of the composite color image is a function of the first gray value and possibly also the latter N−1 gray values as well. In this way the chromaticity (e.g., hue and saturation) of the fused composite color image is invariant to gray level changes that can occur at pixels in the first image, such as due to illumination variations to which the first image may be sensitive.

For a more specific category of image fusion this invention teaches a methodology for naturally visualizing the fusion of an image produced from a sub-spectrum of the thermal infrared domain with an image produced from a sub-spectrum of the reflective domain (e.g., visible imaging). At each pixel this is achieved by a set of mappings with two inputs from these respective domains and outputting into a hue, saturation, intensity (HSV) color space such as defined in [Foley, Van Dam Feiner and Hughes, "Computer Graphics: Principles and Practice", 1990, Addison Wesley]. A key advantage to this image fusion visualization methodology is the color invariance to changes in the reflective domain input value. In this way the color visualization of the thermal infrared domain is preserved for reflective illumination variations that occur in a scene. To human perception this segregates the contrast detail for the thermal infrared image as distinct from the contrast detail of the reflective domain image not just for still frames but for continuous video operation viewing a dynamic scene.

The HSV values computed from this methodology can then be converted by standard means into the appropriate color space values (e.g., tri-stimulus RGB, YIQ, S-video) respective to a color display such as a TV, computer monitor or a head mounted micro-display for viewing. An aspect that adds functionality to this set of mappings into HSV are user controlled input parameters $\alpha$ and $\beta$. With $\alpha$ set to 0, variation in β produces controlled combinations of intensities from both thermal infrared and reflective inputs at each pixel. In this case the visualization has no perceived coloration. With increasing non-zero α the visualization produces correspondingly increased saturation for pixels at which there is significant thermal infrared with a color hue dependent upon the strength of the thermal infrared input. Intuitively the α parameter controls the saturation strength of a colorized thermal infrared domain image overlayed on top of the reflective domain image while the β parameter controls the relative additive combination of intensity with thermal infrared.

As the image fusion methodology is based on thermal infrared/reflective domain values at co-registered pixels from images in these respective domains, it is amenable to using a Look-Up Table (LUT) procedure for implementation on a computational hardware apparatus. Currently the Equinox DVP-3000 dual video processing board uses an Altera Cyclone FPGA to implement this procedure. Auxiliary to implementing this image fusion methodology is the use of Automatic Gain Control (AGC) which is often needed to compress the dynamic range of input imagery while preserving its most important gray level detail. An efficient binary search method for AGC using a small number of gray level bins whose bounds can be dynamically changed is also described.

This invention is beneficial to sensor technology that acquires both reflective spectrum (e.g., visible) imagery and thermal infrared imagery. This can either consist of separate visible and thermal infrared sensors or integrated visible/thermal infrared sensors. Cameras that use CCD, CMOS and CID focal plane arrays (FPA) have sensitivity typically in the 0.4-1.0 micron wavelength range spanning the visible and near-infrared spectrums. The InGaAs FPA made by Sensors Unlimited has a sensitivity range typically 0.9-1.7 microns. Cooled InSb FPA has good sensitivity in the 3-5 micron thermal infrared range, while cooled MCT or QWIP FPA, and uncooled microbolometer FPA, have good sensitivity in the 8-12 micron range. The methodology can be applied to two or more of these imaging modalities at once. For instance, a color composite image of LWIR, MWIR and visible images can be formed by mapping LWIR and MWIR gray values to the chromaticity plane of a color space independent of gray values comprising the visible image. This fusion methodology can also be applied to N hyper-spectral images as well as to multiple modalities used for medical imaging such as MRI, CAT and PET.

BRIEF DESCRIPTION OF THE DRAWINGS

FIGS. 4A through 4D illustrate a number of configurations of reflective spectrum and thermal infrared spectrum imaging sensors at various levels of integration;

DETAILED DESCRIPTION OF THE INVENTION AND PREFERRED EMBODIMENTS

Figure 1:
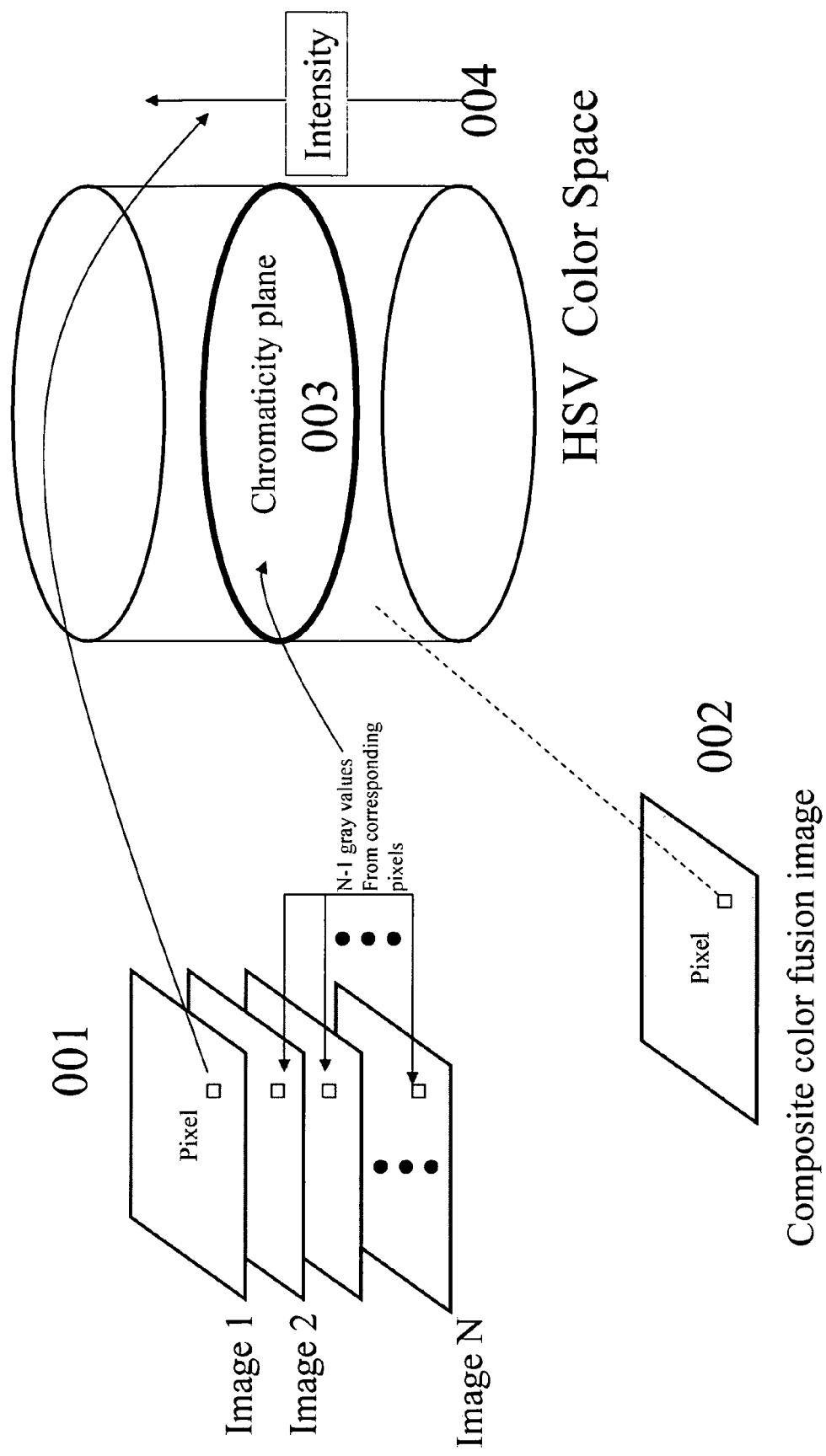
FIG. 1 describes how a composite color fused image is created from N gray level images using the natural decomposition of color spaces into chromaticity and intensity.
Figure 5:
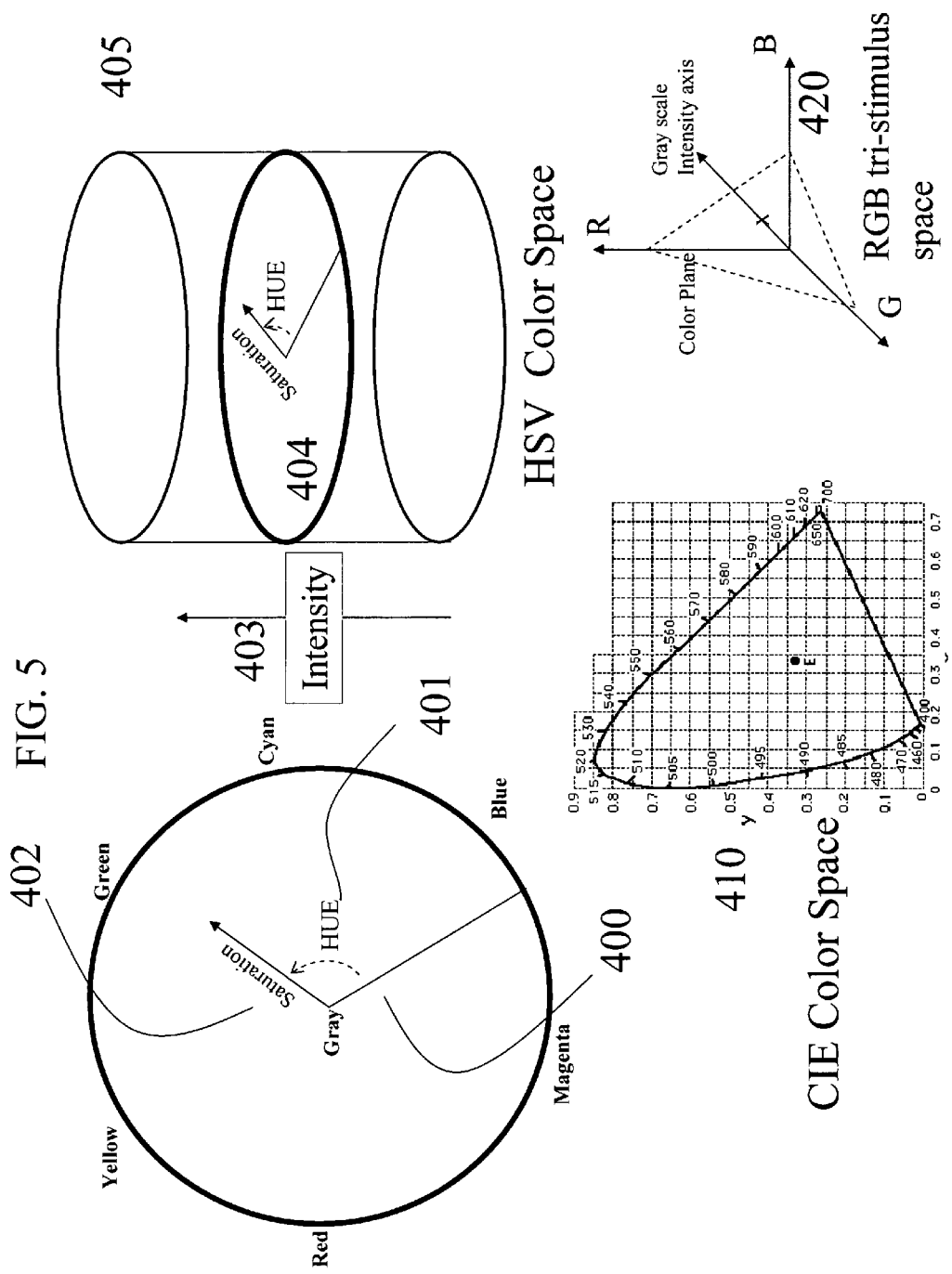
FIG. 5 shows depictions of the HSV color space as well as CIE and RGB color spaces.

FIG. 1 shows the methodology of forming a color composite image 002 from N gray level images 001 by decomposing the color space representation into its chromaticity planes 003 and intensity 004 (in this case HSV space further described in FIG. 5) and making the mapping into chromaticity plane coordinates only dependent on the corresponding gray values of the latter N−1 images and independent of the gray values of the first image. It is important to note that the HSV color space 405 illustrated in FIG. 5 is only one such color space that can be naturally decomposed into segregated 2-D color planes 404 orthogonal to the 1-D intensity axis 403. For instance, the well-known CIE color space 410 and other variants that are psychophysically accurate, and RGB tri-stimulus color spaces 420 can be used just as well [Wyszecki, Stiles, "Color Science: Concepts and methods, Quantitative Data and Formulae", 1982, John Wiley & Sons]. This certainly does not exhaust the list of possible color spaces that can be used. The intensity value of the composite color image is a function of the first gray value and possibly also the latter N−1 gray values as well.

Figure 2:
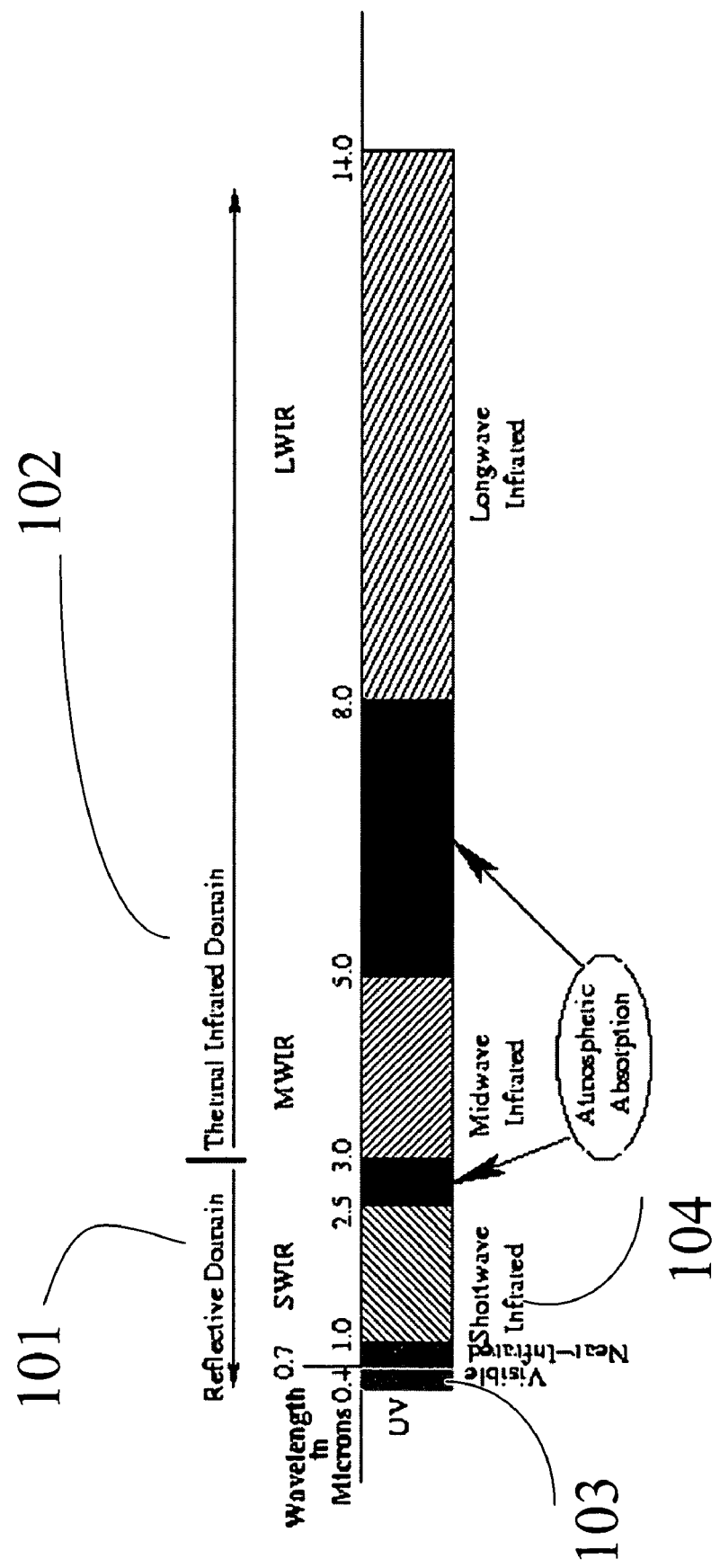
FIG. 2 is a taxonomy of important regions of the electromagnetic spectrum, defining the Reflective and Thermal Infrared domains (spectrums) discussed herein.

It should be noted that the term infrared as used in the literature does not always refer to thermal infrared, and in fact as shown in FIG. 2 of the electromagnetic spectrum at various wavelengths there are important imaging sub-spectrums of the infrared spectrum that primarily record reflective phenomenology, such as the near-infrared 103 and the shortwave infrared 104 (SWIR). Image fusion described herein refers to fusion of images taken from a sub-spectrum of the reflective domain 101, and a sub-spectrum of the thermally emissive (i.e., thermal infrared) domain 102 as specified in FIG. 2.

Figure 3:
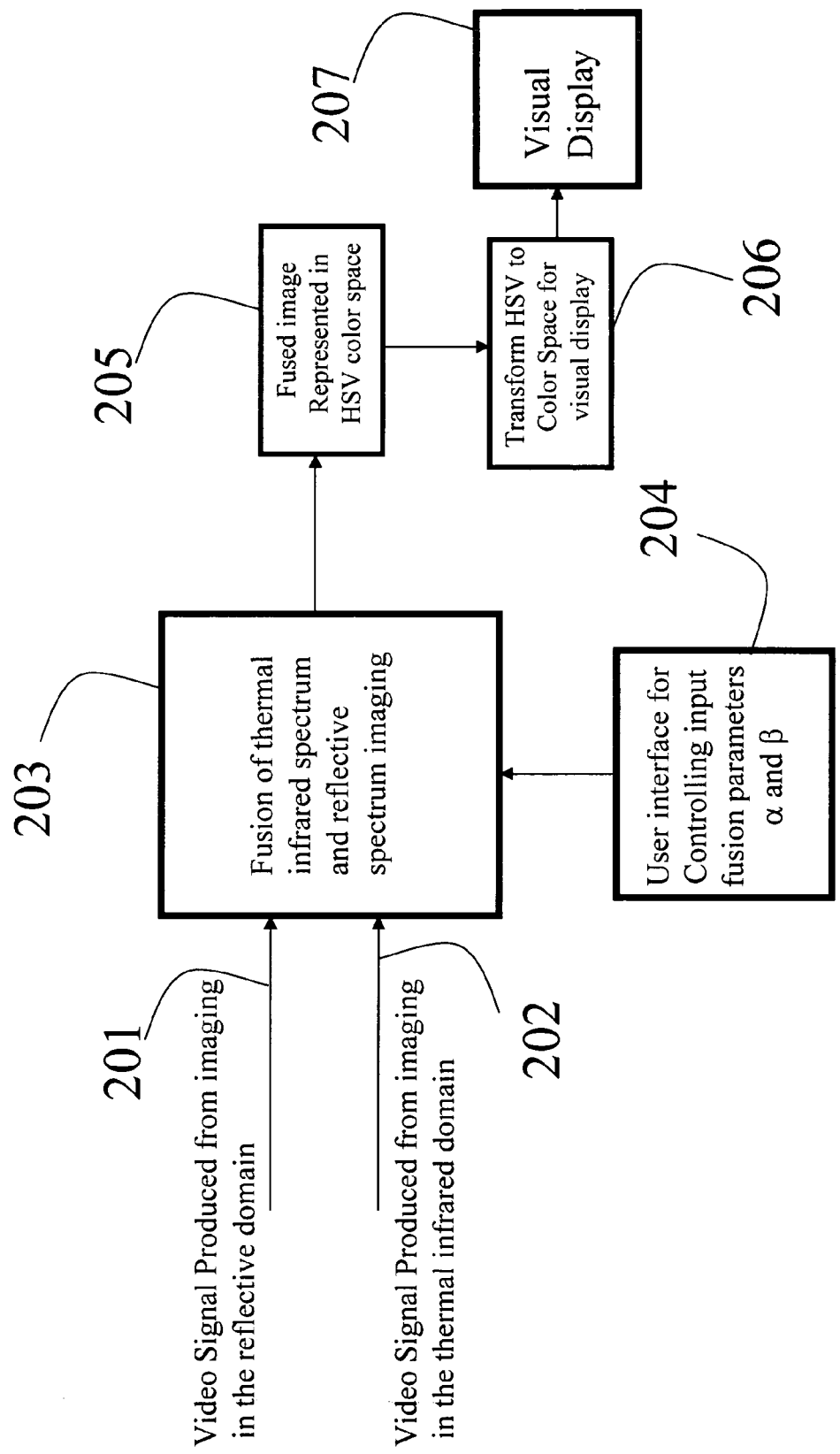
FIG. 3 is a high-level overview of where the image fusion methodology and apparatus fit within an end-to-end system.

The methodology for image fusion 203 in FIG. 3 accepts two inputs that are video signals respectively corresponding to imagery in the thermal infrared domain 202 and imagery in the reflective domain 201. These signals can come from camera/sensor systems viewing a scene, for which FIGS. 4A-4D show multiple possible configurations for such systems. The reflective and thermal infrared inputted signal images are respectively assumed to represent gray value pixel images. For instance, if the reflective domain camera is a visible spectrum 3-color camera the signal 201 represents the gray scale luminance of the color image. The image video signals 201 and 202 outputted from cameras can be in many forms such as analog including but not limited to RS-170, NTSC, S-Video and PAL or in digital format including but not limited to Firewire, USB 2.0, RS-422, RS-644, LVDS and CameraLink. It is also possible that the respective input image video signals 201 and 202 could be produced from synthetically generated images of scenes, respectively in the reflective 101 and thermal infrared 102 domains, using physical modeling and computer graphics rendering techniques including but not limited to flight simulator applications, and ground-based simulator applications. Preferably the thermal infrared and reflective domain images are geometrically co-registered pixel to pixel. The tolerances on just how exact this image geometric co-registration needs to be are application and user dependent.

FIGS. 4A-4D illustrate a number of ways to configure a camera sensor system that simultaneously acquires reflective spectrum and thermal infrared imagery of a scene and that respectively output image video signals 201 and 202. At the least, cameras/sensors that use a Focal Plane Array (FPA) 310 that senses in the reflective spectrum (e.g., CCD, CMOS 0.4-1.0 microns, InGaAs 0.9-1.7 micron), and an FPA 320 that senses in the thermal infrared (e.g., InSb 3.0-5.0 microns, MCT 8-12 microns, microbolometer 8-14 microns) are required. FIG. 4A shows two separate cameras, one camera for the reflective domain 301 and one camera for thermal infrared domain 302, with respectively separate electronics and separate lens optics 311 and 321. In this case the two cameras are boresighted so that the optical axis for each camera lens is parallel, and viewing differences between the two cameras only exists with respect to the translational baseline segment determined by the optical centers for each camera. This produces some translational disparity between the respective image pixels for the reflective domain and thermal infrared domain FPAS. FIG. 4B shows configurations that improve pixel to pixel image co-registration accuracy using the same two separate cameras 301 and 302 as in FIG. 4A but incorporating a dichroic beamsplitter 340 that takes radiation 336 from a scene and either transmits thermal infrared domain radiation and reflects reflected domain radiation, or vice versa. If the dichroic beamsplitter 340 thus transmits the thermal infrared domain radiation to the camera 301, then the reflected domain radiation is reflected by the dichroic beamsplitter 340 and directed to the second camera 302 via a mirror 341. A dichroic beamsplitter used in this fashion further reduces the baseline displacement between the reflective domain and thermal infrared domain cameras. FIG. 4C shows an integrated camera 344 having two FPAs 346 and 348, respectively, sensing in the reflective domain and in the thermal infrared domain. An important difference between the configuration of FIG. 4B and that of FIG. 4C is that the later configuration includes a dichroic beamsplitter 342 completely behind all common focusing optics 350. This completely eliminates depth dependent disparity between the reflective domain and thermal infrared domain FPAS. FIG. 4D depicts a camera 358 with a hybrid FPA 360 capable of sensing both a subspectrum of reflective domain and thermal infrared radiation 364 with a focusing lens 362.

In a preferred embodiment the image fusion 203 produces a colorized image 205 represented in a hue, saturation, intensity (HSV) color space. The hue, saturation, intensity values at each pixel of the color image 205 are computed from corresponding co-registered pixel gray values in the reflective 201 and thermal infrared 202 images. That is for each pixel in the reflective domain image 201 with gray value VIS co-registered to a pixel in the thermal infrared image 202 with gray value IR, the image fusion 203 computes a mapping (VIS, IR)→(H, S, V) described in FIGS. 6 and 7. This mapping is performed on pairs of corresponding reflective/thermal infrared images on a frame-by-frame basis in synchronization with the video image inputs 201 and 202. The computations used in this mapping can be modified by two user inputted parameters α and β 204. These input parameters can be user controlled by convenient interfaces including but not limited to knobs (e.g., optical encoders), buttons and keyboards. The HSV color fused image 205 is converted by standard known means [Foley, Van Dam Feiner and Hughes, "Computer Graphics: Principles and Practice", 1990, Addison Wesley] to a color space representation (e.g., YIQ, RGB) 206 compatible with a chosen color display device 207. This color display device could be but not limited to a TV monitor, computer monitor or a color micro-display. The final color image video signal outputted from 206 can be analog or digital in the formats listed above, according to compatibility with the color display device 207.

Figure 6:
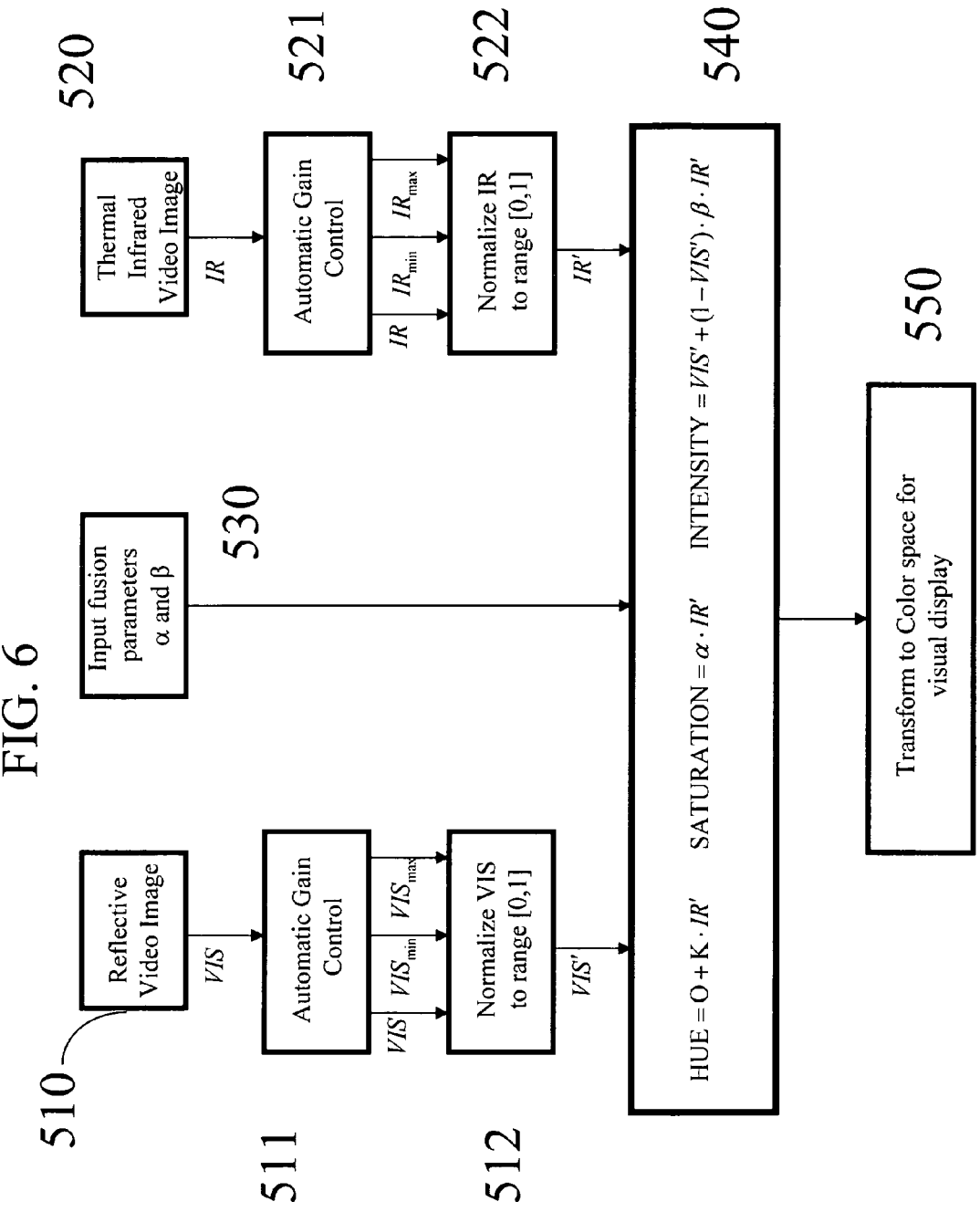
FIG. 6 gives a flowchart description of the image fusion mapping from thermal infrared/reflective domain values into hue, saturation and intensity.

In FIG. 6 the gray scale reflective domain image 510 corresponds to video signal input 201 and the gray scale thermal infrared domain image 520 corresponds to video signal input 202. An optional pre-processing computational step performed on these respective images is automatic gain control (AGC) whereby for each image an upper bound gray value ($IR_{max}$ for thermal infrared, $VIS_{max}$ for reflective) and a lower bound gray value ($IR_{min}$ for thermal infrared, $VIS_{min}$ for reflective) are derived to establish the dynamic range of gray values in the current image of the scene (511 and 521 respectively). For instance, a number of thermal infrared cameras have digital video outputs that are 12-bits (i.e., 4096 gray counts) in full dynamic range, but some of these bits are extraneous to representing the gray values across the image of a scene. By looking at a gray level histogram of an image typically a vast majority of gray values fall within a range [$IR_{min}$, $IR_{max}$] that can be adequately represented with 8-bit gray values. There are image fusion computational advantages to this as well as the fact that a number of color display devices support a limited amount of color fidelity (e.g., NTSC) where anything more than 8-bit inputs do not produce any better results. There are thermal infrared cameras and many visible cameras that already perform AGC and generate appropriate 8-bit video outputs. In these cases AGC is turned off and the min and max gray values are effectively automatically set to 0 and 255 respectively.

Figure 7:
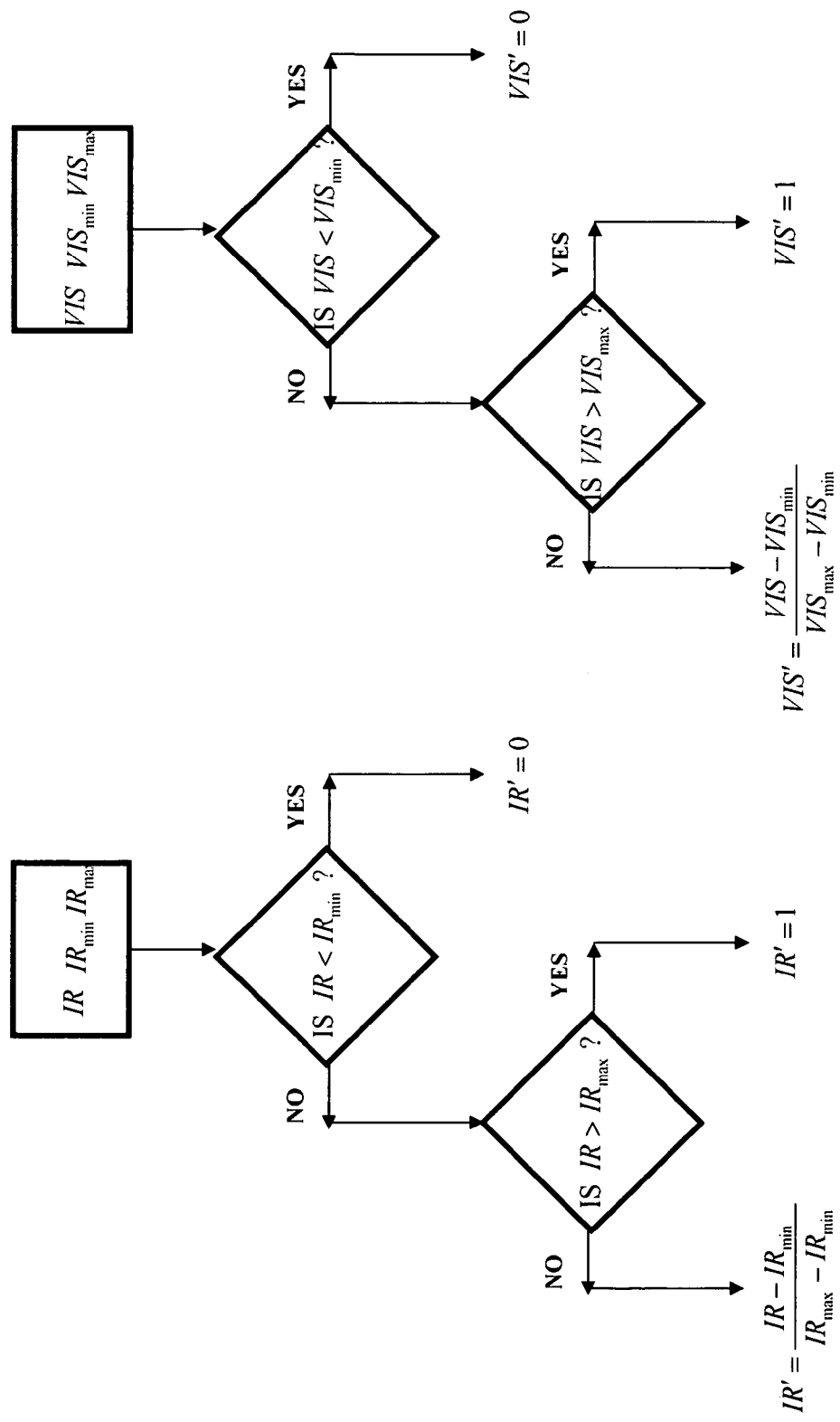
FIG. 7 gives a flowchart description of the details of the methodology for normalizing thermal infrared and reflective domain image gray values.

Each pixel gray value IR (VIS) in a respective thermal infrared (reflective) image is normalized to IR' (VIS') in the range of values [0,1] according to 522 (512) as detailed in FIG. 7. The values for IR', VIS' are then used in conjunction with user input parameters α, β 530 to compute HSV values shown in 540. For purposes of the computation described in FIG. 6 the range of values for α and β is [0,1]. Referring again to FIG. 5, the angular value derived for hue 401 uses pre-assigned offset angle O and scale K multiplied by IR' so that hue is only dependent upon the input IR and invariant to reflective domain value VIS. The offset O establishes the zero degree hue polar axis line 400 and the scale K establishes the dynamic range of angular hues starting from this axis. In an alternative embodiment O and K could be user interactive input parameters additional to α and β. In 540 saturation is derived by multiplying α with IR'. In alternative embodiments saturation can be derived from most any monotonic increasing function of α and IR', or even just α alone. Saturation from [0,1] represents the distance 402 from the center of the color wheel circle where full saturation 1.0 is on the circumference. Again, the saturation derivation is invariant to the reflective domain value VIS. Intensity in 540 is derived by an additive mixing of VIS' and IR' the relative combination being controlled by parameter β. In an alternative embodiment α and β can be pre-set to fixed values. However the user interactive input provides added convenience and functional capability.

It is important to note that FIGS. 6 and 7 describe a specific instance of forming a color composite image as described in FIG. 1 for N=2, the first image is a reflective domain image and the second image is a thermal infrared image and the mapping into chromaticity coordinates is only dependent upon thermal infrared gray values and independent of reflective domain image values. Again, the HSV color space 405 shown in FIG. 5 is only one such color space that segregates the 2-D color plane 404 orthogonal to the 1-D intensity axis 403. The well-known CIE color space 410 and other variants that are psychophysically accurate, and RGB tri-stimulus color spaces 420 can be used just as well. This certainly does not exhaust the list of possible color spaces that can be used. While FIG. 6 describes a particular mapping, many other desirable mappings are possible that exploit creating a fused color composite image whose chromaticity is invariant to reflective domain illumination changes. This also does not preclude the possibility of reversing the roles of the thermal infrared and reflective domain images, making composite color fusions with chromaticity invariant to thermal infrared changes by making chromaticity coordinates only dependent upon the reflective domain.

Figure 8:
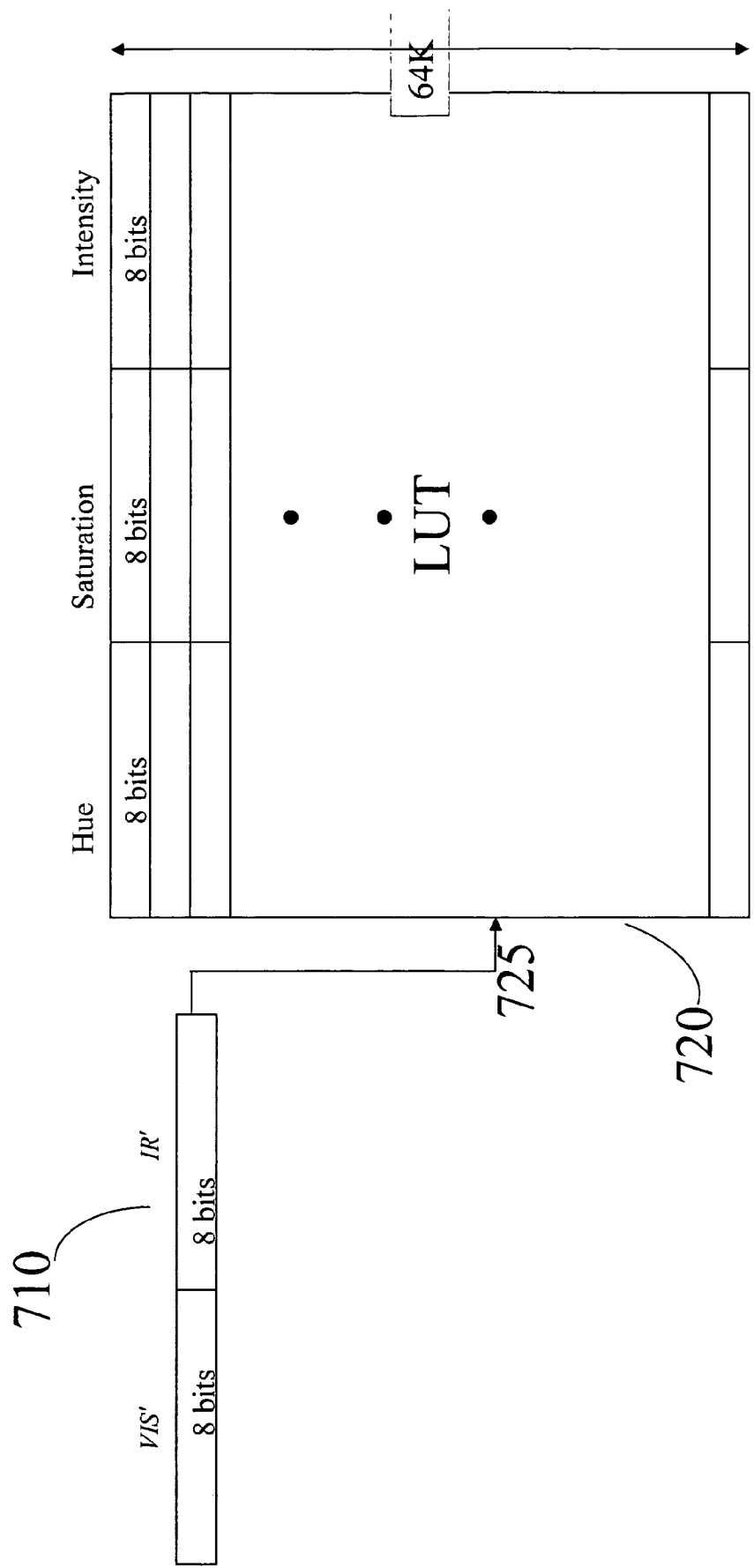
FIG. 8 shows a high-level description of how image fusion can be implemented using a Look-Up Table (LUT)

As the image fusion methodology portion described in FIGS. 6 and 7 is performed on co-registered pixel-wise pairs of values it is amenable to implementation by an apparatus that uses a Look-Up Table (LUT) procedure. Assuming preset values for O and K and a given pair of input parameters α and β, it is clear that 540 defines a unique mapping (VIS', IR')→(H, S, V). By representing both VIS' and IR' as binary bit values, these bit values concatenated together 710 form an address 725 in which to look up in electronic memory 720 (e.g., EEPROM) the values for hue H, saturation S, and intensity V. In the case of FIG. 8 this table takes up 3×64K=192K bytes of memory. For fast low-power FPGA devices this amount of memory can be excessive and a number of alternative embodiments exist to reduce the amount of memory used. First is that the human eye does not perceive saturation at a high resolution such as 8-bits so this portion of the table can be significantly reduced. Second is that the input number of bits representing (VIS', IR') can also be significantly reduced without compromising too much color fidelity.

Figure 9:
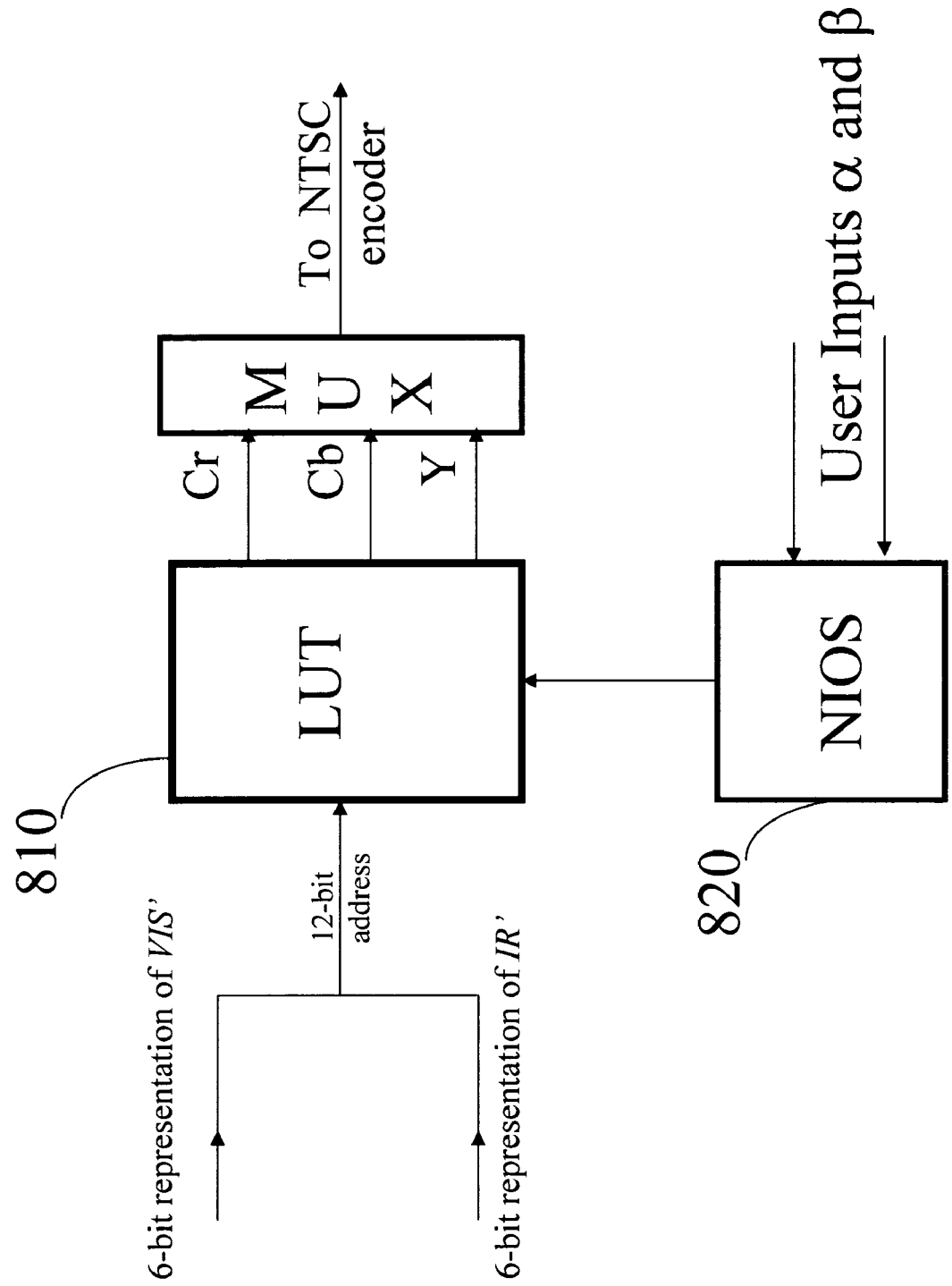
FIG. 9 gives a description for how a LUT is used to perform image fusion in an Equinox DVP-3000 product.
Figure 10:
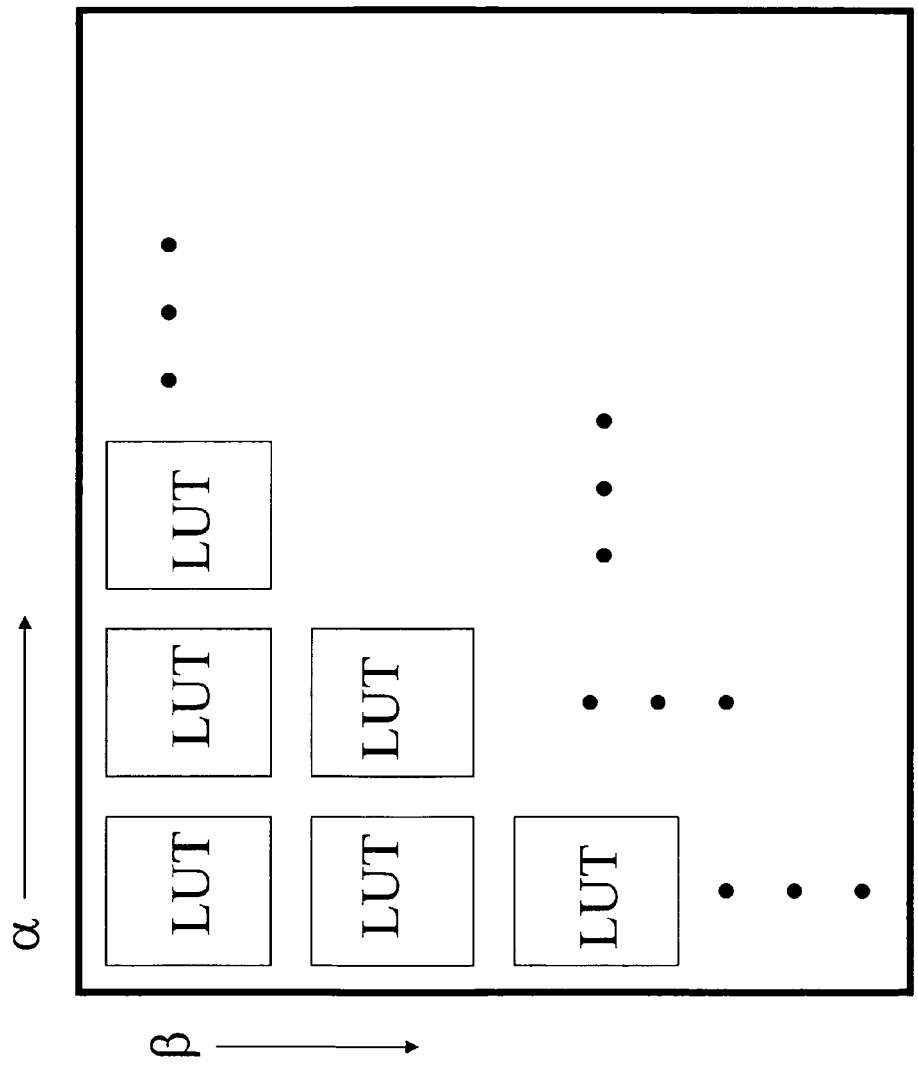
FIG. 10 shows a high-level description of how a LUT of LUTs can use addressing by input parameters α and β.

FIG. 9 describes the image fusion look-up table portion for how implementation occurs on the Equinox DVP-3000 product using Altera's Cyclone FPGA. The inputs VIS' and IR' are truncated down to 6 bits each so that only a 12-bit address is used. The advantage of using a LUT is that since it implements a mathematical mapping it can directly map VIS' and IR' into the color space values required by the color display input. In the case of the DVP-3000 the mapping (VIS', MR')→(Y, Cr, Cb) is performed for NTSC video output which is the composition of the mappings (VIS', IR')→(H, S, V)→(R, G, B)→(Y, Cr, Cb) where these mappings are defined in standard color video manuals. So the look-up table 810 is effectively performing the operations 540 and 550 at the same. Since (Y, Cr, Cb) is a 24-bit word the internal memory 810 only needs to be 12K bytes. The Altera Cyclone FPGA has embedded a NIOS processor 820 which can take inputs α and β from a user interface and compute a new LUT based upon new input α and/or β. In an alternative embodiment to eliminate arithmetic computation altogether, in a larger memory space can be contained pre-computed LUTs for a discrete set of α and β parameters settings. In essence this is a LUT of LUTs where α and β are used to address the beginning memory space of which LUT to use and VIS' and IR' as before are used to address within this selected LUT (see FIG. 10). It should be noted that FIGS. 8, 9 and 10 describe one of many possible hardware implementations of the described image fusion methodology which could include but not limited to implementations by PC computer, ASIC and analog VLSI.

Figure 12:
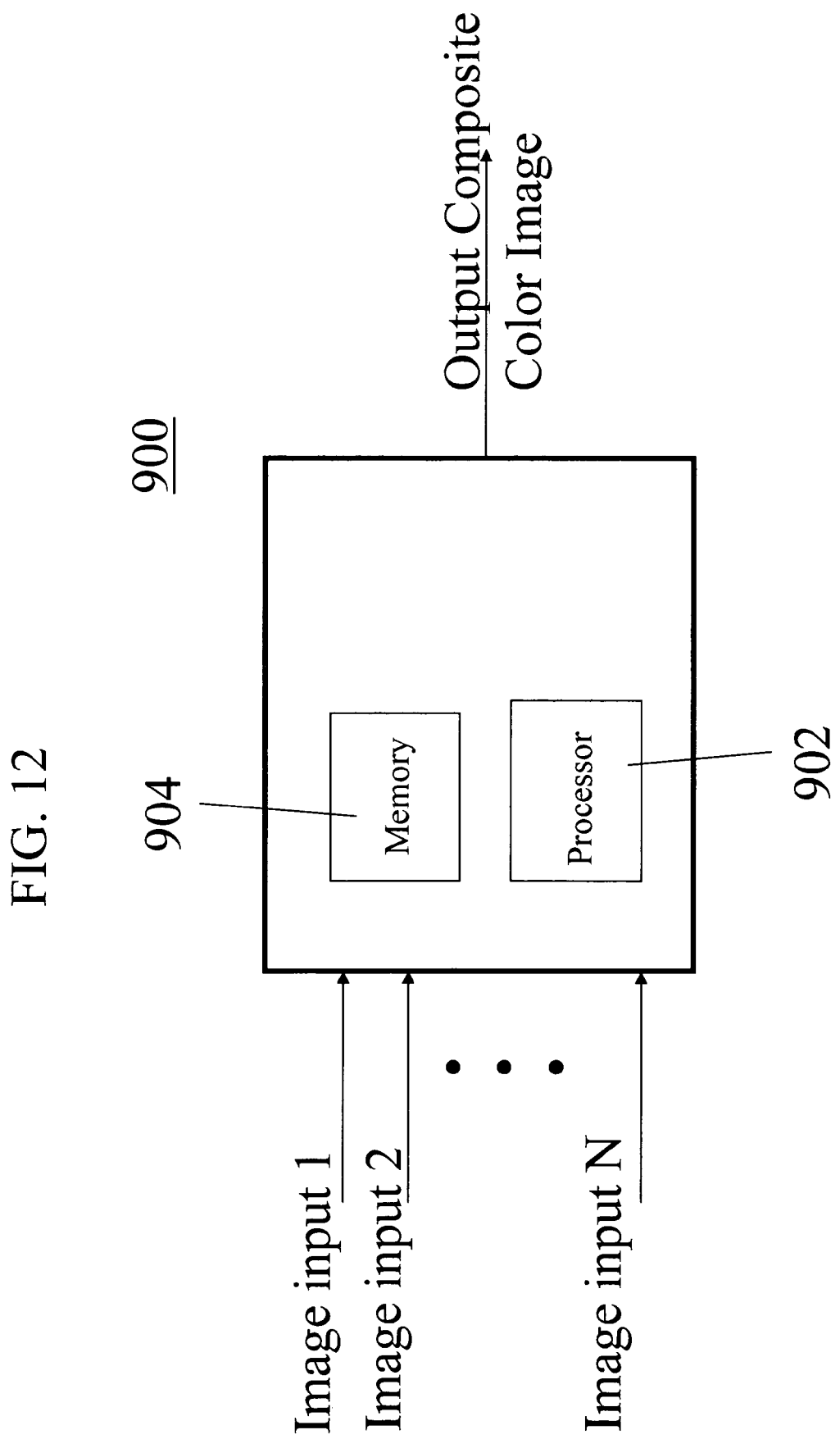
FIG. 12 is a schematic illustration of a processor system that can be used to implement the image fusion technique of the present invention.

A generic processor system 900 for implementing the subject image fusion methodology is illustrated in FIG. 12. As is conventional, the processor system 900 includes an image processor 902 and a memory 904. The processor system 900 receives gray scale multiple pixel images from a plurality of image inputs 1-N. The processor 902 employs the input images to generate the output composite color images by using the image fusion technique of the present invention. Although the processing system 900 is preferably digital, it will be understood that analog, optical or any other suitable type of processing system could be employed to implement the subject invention Referring once again to FIG. 6, Automatic Gain Control (AGC) (511 and 521) automatically achieves overall image contrast, eliminating the need for manual adjustments in situations where image intensity fluctuates over time. Although image pixels are represented using 8 or 16 bits, the actual range of the pixels is much smaller than that. The image contrast can be significantly improved if the pixels are mapped to a fixed interval, for example an 8 bit interval, from 0 to 255. Before mapping we remove outliers (usually due to camera noise) by removing a small percentage from the two tails of the pixel distribution. Hence, the AGC mapping is a linear function that maps the k-th smallest pixel $I_k$ and the l-th largest pixel $I_l$ of an image to the upper and lower bound of a fixed interval. The image pixel range can vary significantly over time, due to changes in illumination or in the scene being imaged. Therefore the AGC mapping needs to be recomputed for each frame.

Figure 11A:
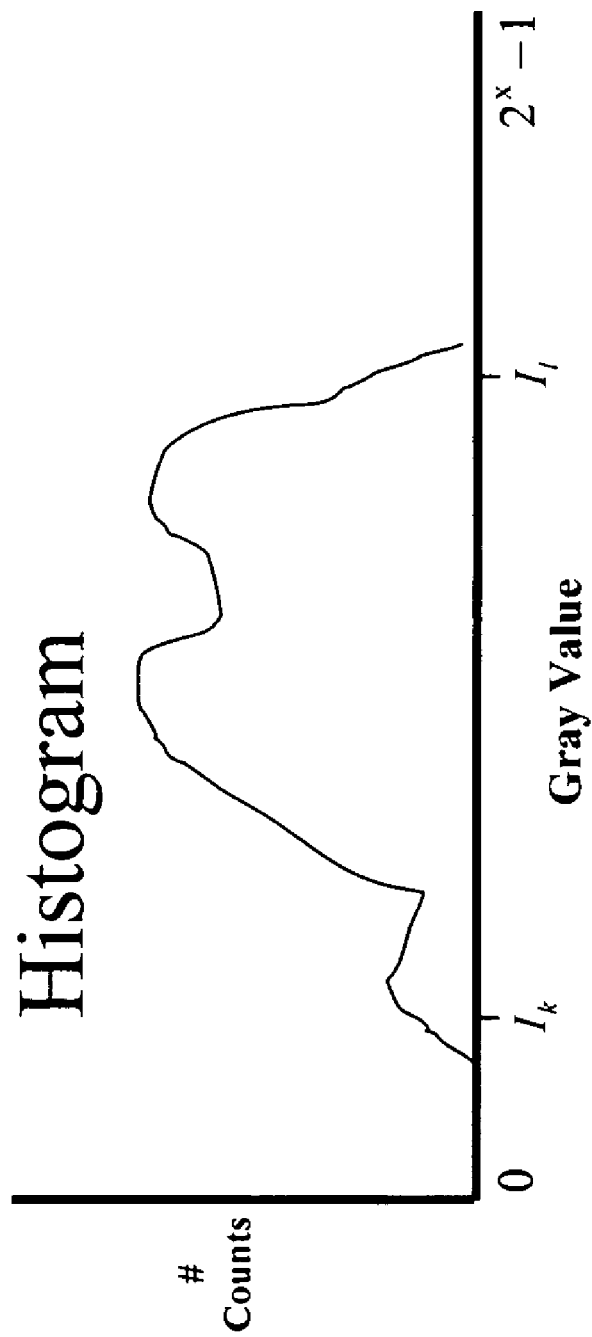
FIG. 11A shows a gray level histogram with kth smallest gray value $I_k$ and Ith largest gray value $I_l$.

Finding $I_k$ and $I_l$ (see FIG. 11A) through sorting is computationally unfeasible due to the size of the image. Instead, we approximate these values using an n-bin image histogram:

$h_i = |\{I_j, \text{where } b_{i-1} < I_j < b_i\}|$ where $0 = b_0 \leq b_1 \leq \ldots \leq b_n = 2^x - 1$ for an x-bit image, and $|A|$ is the cardinality of set A.

If n is sufficiently large, we define binSize=$(2^x - 1)/n$ and $b_i = i \cdot$binSize. Then $I_k = b_p$ where p is such that $$\sum_{i=1}^{p} h_i \leq k$$

and $$\sum_{i=1}^{p+1} h_i > k.$$

Similarly, $I_l = b_r$ where r is such that $$\sum_{i=r}^{n} h_i \leq l$$

and $$\sum_{i=r-1}^{n} h_i > l.$$

Figure 11B:
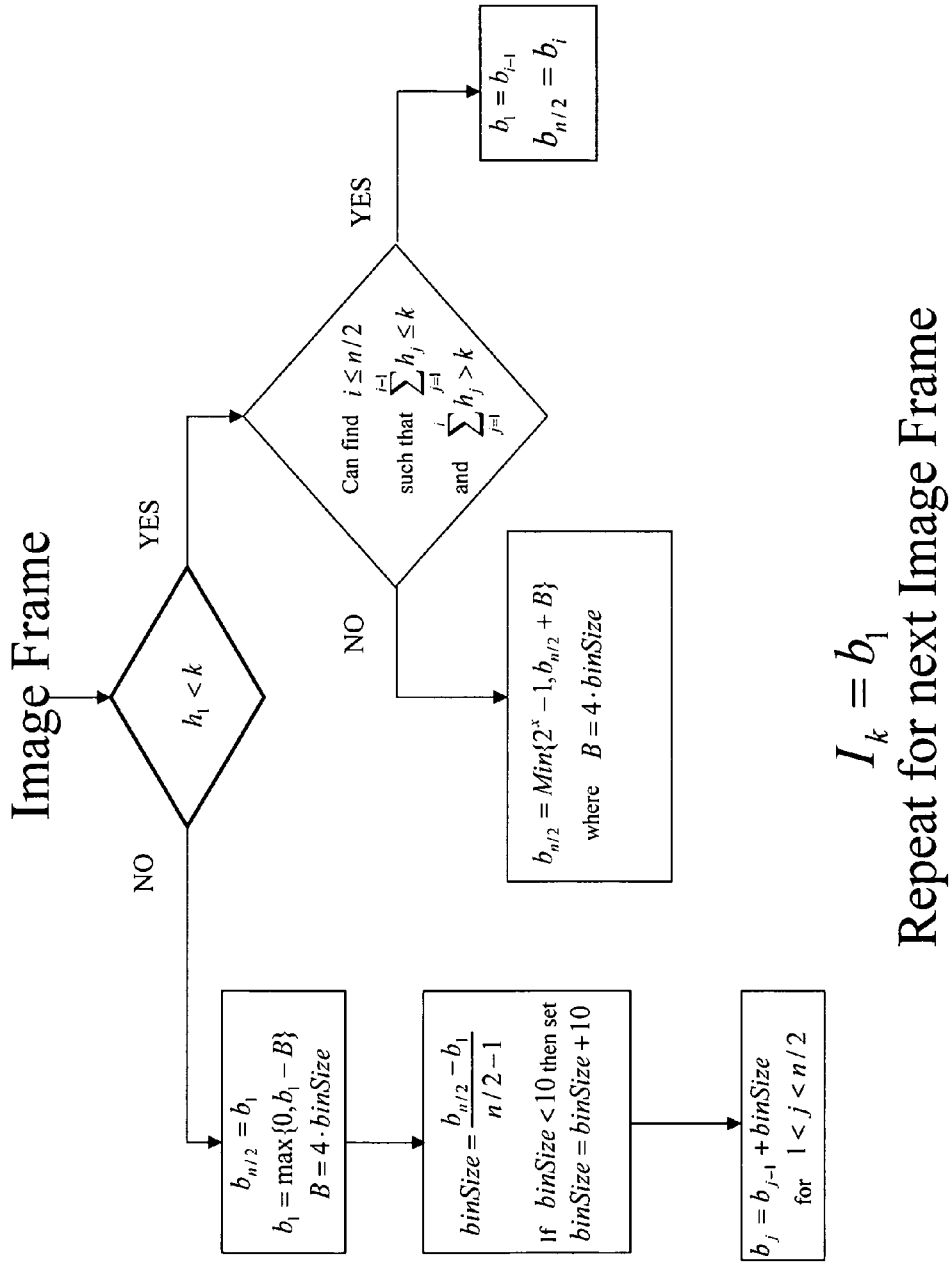
FIG. 11B shows an iterative binary search technique to find $I_k$.
Figure 11C:
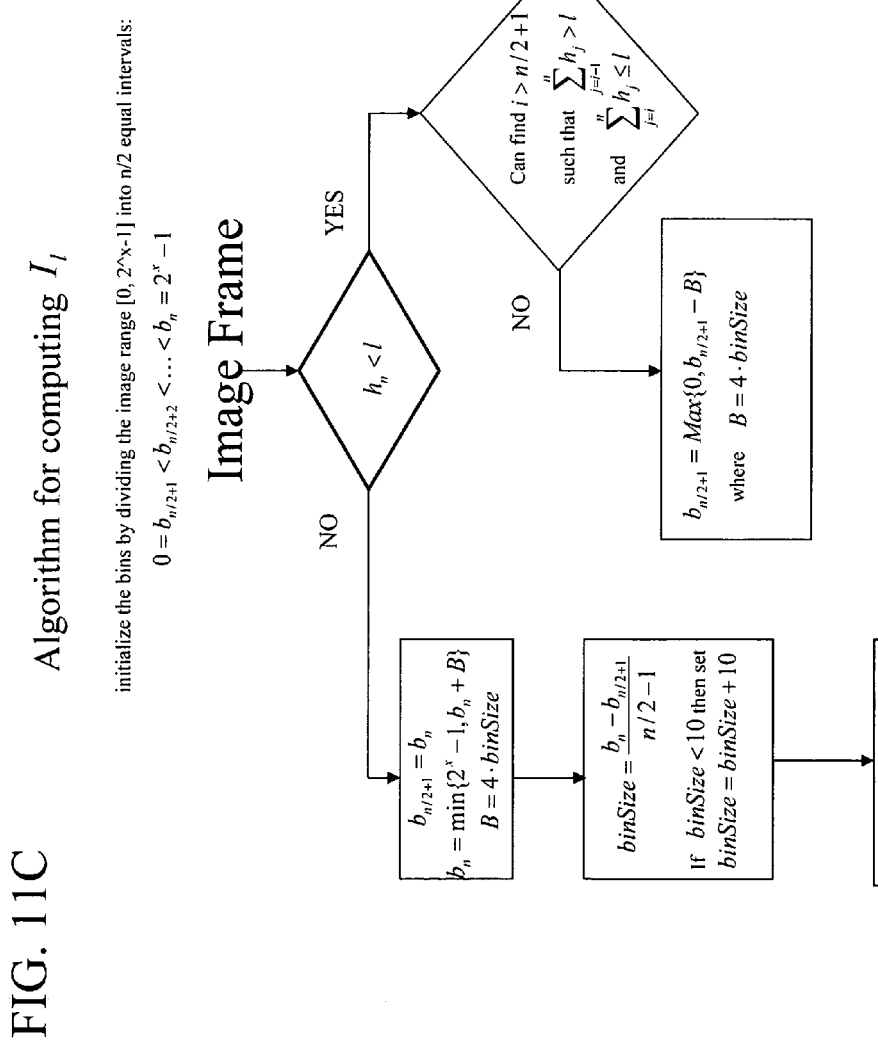
FIG. 11C shows an iterative binary search technique to find $I_l$.

For practical video rate computation in existing hardware n has to be very small however (e.g., n=8) so this approximation doesn't yield satisfactory results. FIGS. 11B and 11C describe a binary search technique that iteratively computes half of the histogram bins for $I_k$, leaving the other half for $I_j$, until $b_1 \cong I_k$ and $b_n \cong I_j$. Since the image doesn't change drastically from one frame to the next, we can speed up the process by performing each iteration on a new frame. The bins $b_1 \leq \ldots \leq b_{n-1}$ dynamically adjust themselves according to the gray scale distribution of each successive frame.

Although the invention has been described in terms of various preferred embodiments, it will be understood that numerous variations and modifications may be made without departing from the true spirit and scope thereof, as set forth in the following claims.

What is claimed is:

1. A method for creating a color composite image fusion, comprising:
   providing one or more reflective input images and one or more thermal infrared input images, each image being defined by a plurality of gray scale pixel values; and
   employing a processor to 1) map each of said gray scale pixel values in said one or more reflective input images only to a corresponding value in an intensity space (V) of an HSV color space, said HSV color space including a hue (H), saturation (S) chromaticity space and said intensity (V) space; 2) map each of said gray scale pixel values in said one or more thermal infrared images to a corresponding value in said HSV color space; and 3) generate a composite image from the values in said intensity space and said chromaticity space.

2. The method of claim 1, wherein said one or more reflective input images consist of a single visible image and said one or more thermal infrared input images consist of a single LWIR image.

3. The method of claim 1, wherein a degree to which the pixel values of said one or more thermal infrared input images influence the saturation values can be adjusted.

4. The method of claim 3, wherein a degree to which the pixel values of said one or more thermal infrared input images influence the intensity values can be adjusted.

5. The method of claim 1, wherein said mapping steps are carried out by said processor accessing a lookup table.

6. The method of claim 1, wherein each of said input images are preprocessed by said processor using an automatic gain control function.

7. A processing apparatus for implementing image fusion, comprising:
   an input for receiving one or more reflective input images and one or more thermal infrared input images, each of said images including a plurality of gray scale pixel values;
   a memory for storing said images; and
   an image processor for combining said one or more reflective input images and said one or more thermal infrared input images into a third fused image,
   said processor being programmed to:
   1) map each of said gray scale pixel values in said one or more reflective input images only to a corresponding value in an intensity space (V) of an HSV color space, said HSV color space including a hue (H), saturation (S) chromaticity space and said intensity (V) space;
   2) map each of said gray scale pixel values in said one or more thermal infrared input images to a corresponding value in said HSV color space; and
   3) generate said third fused image from the values in said intensity space and said chromaticity space.

8. The apparatus of claim 7, wherein said one or more reflective input images consist of a single visible image and said one or more thermal infrared input images consist of a single LWIR image.

9. The apparatus of claim 7, wherein said processor is further programmed to enable a degree to which the pixel values of said one or more thermal infrared input images influence the saturation values to be adjusted.

10. The apparatus of claim 9, wherein said processor is further programmed to enable a degree to which the pixel values of said one or more thermal infrared input images influence the intensity values to be adjusted.

11. The apparatus of claim 7, wherein a lookup table is provided in said memory that is employed by said processor to map pixel values in said input images to values in said color space.

12. The apparatus of claim 7, wherein said processor is further programmed to preprocess each of said input images using an automatic gain control function.

* * * * *